United States Patent [19]

Baranski

[11] Patent Number: 4,685,016
[45] Date of Patent: Aug. 4, 1987

[54] DOOR OPERATING MECHANISM FOR A CASSETTE USABLE IN A MAGNETIC TAPE RECORDER

[75] Inventor: Antoni S. Baranski, San Carlos, Calif.
[73] Assignee: Ampex Corporation, Redwood City, Calif.
[21] Appl. No.: 767,577
[22] Filed: Aug. 20, 1985
[51] Int. Cl.[4] .................. G11B 23/087; G11B 15/665
[52] U.S. Cl. ........................................ 360/132; 360/85
[58] Field of Search ................... 360/132, 85; 242/198

[56] References Cited

U.S. PATENT DOCUMENTS

| 4,449,677 | 5/1984 | Ohta et al. | 360/132 |
| 4,504,028 | 3/1985 | Goto | 360/132 |
| 4,556,153 | 12/1985 | Takagi et al. | 360/132 |
| 4,564,120 | 1/1986 | Pertzsch et al. | 360/132 |

FOREIGN PATENT DOCUMENTS 60-106087  6/1985  Japan .................................. 360/132

Primary Examiner—Robert S. Tupper
Attorney, Agent, or Firm—Harry G. Thibault; Joel D. Talcott

[57] ABSTRACT

A door operating mechanism for a magnetic tape cassette, such mechanism including a door latch mechanism provided in the cassette capable of rotating a door assembly of the cassette from the fully closed to the fully opened position and designed to prevent the engagement of the door assembly with the tape run contained within the cassette.

11 Claims, 9 Drawing Figures

U.S. Patent  Aug. 4, 1987  Sheet 1 of 4  4,685,016
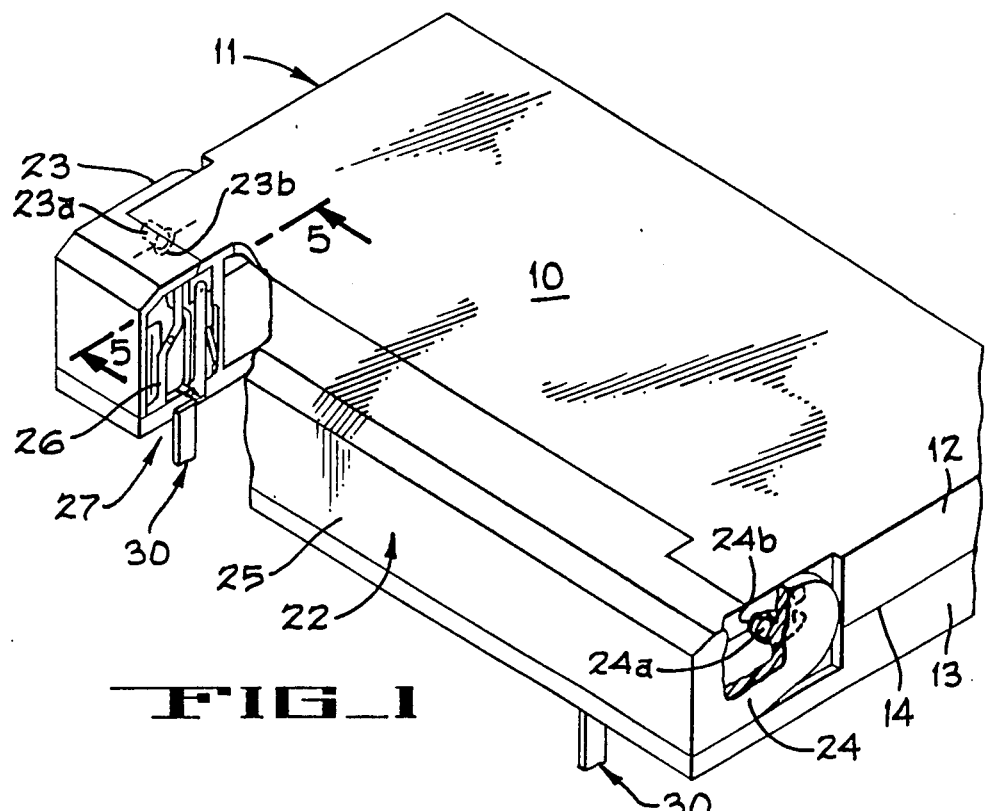
FIG_1
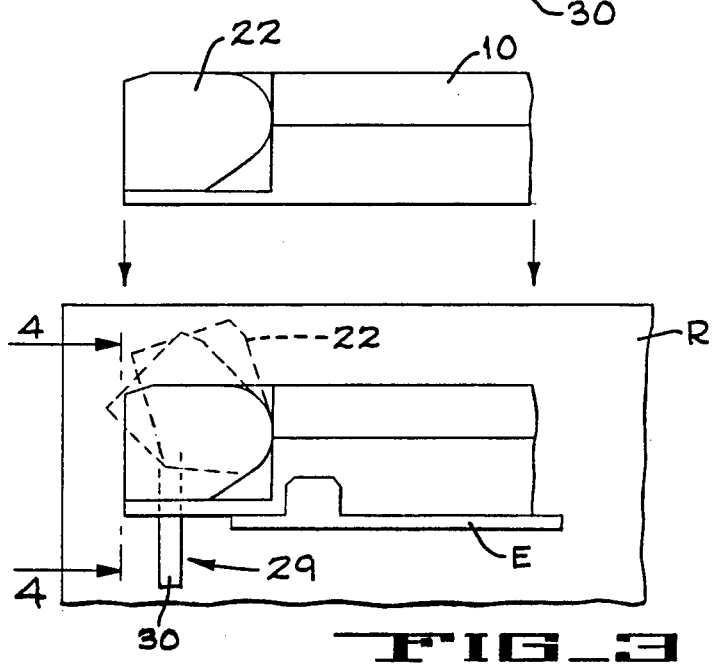
FIG_3

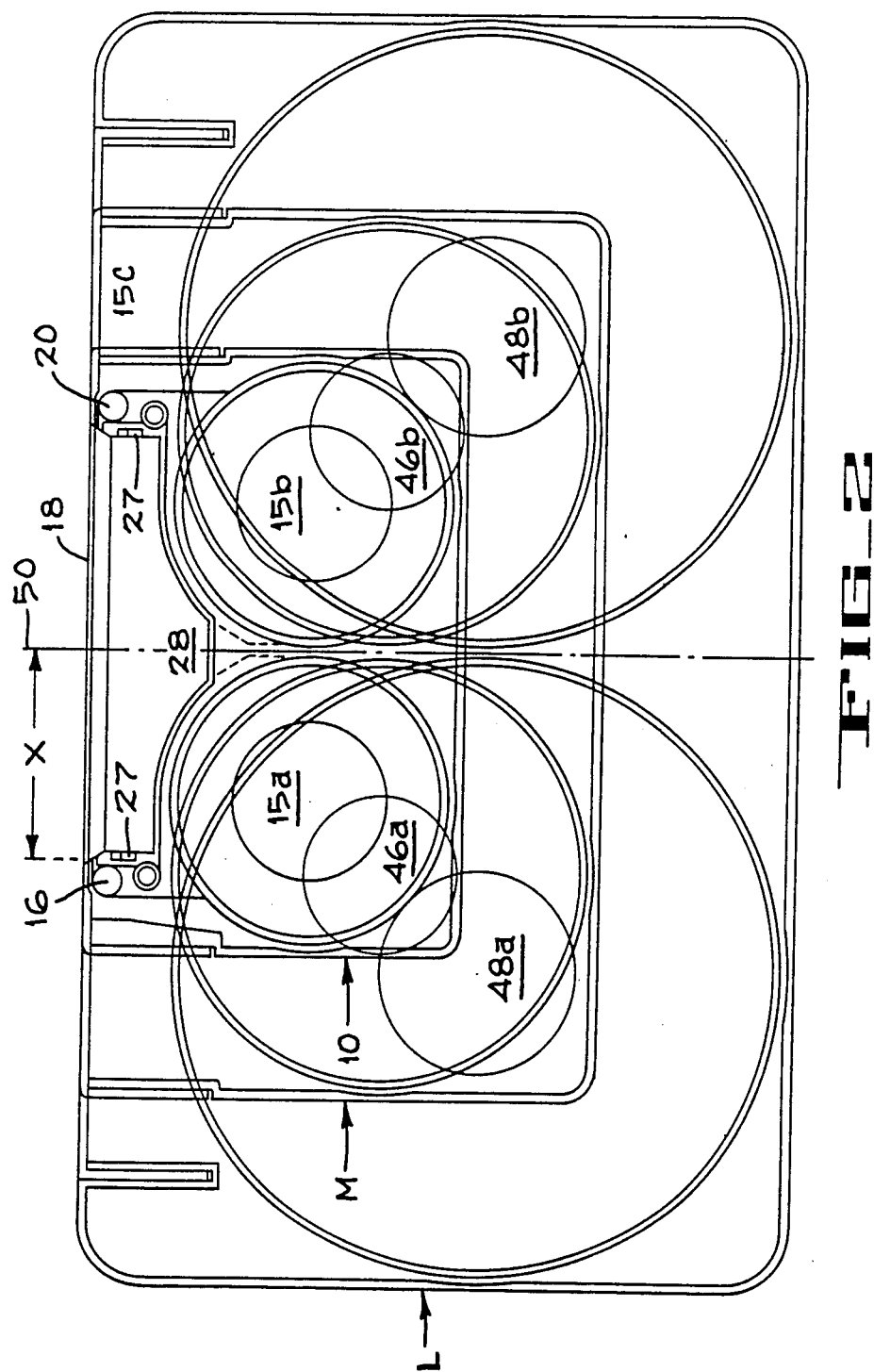
FIG_2

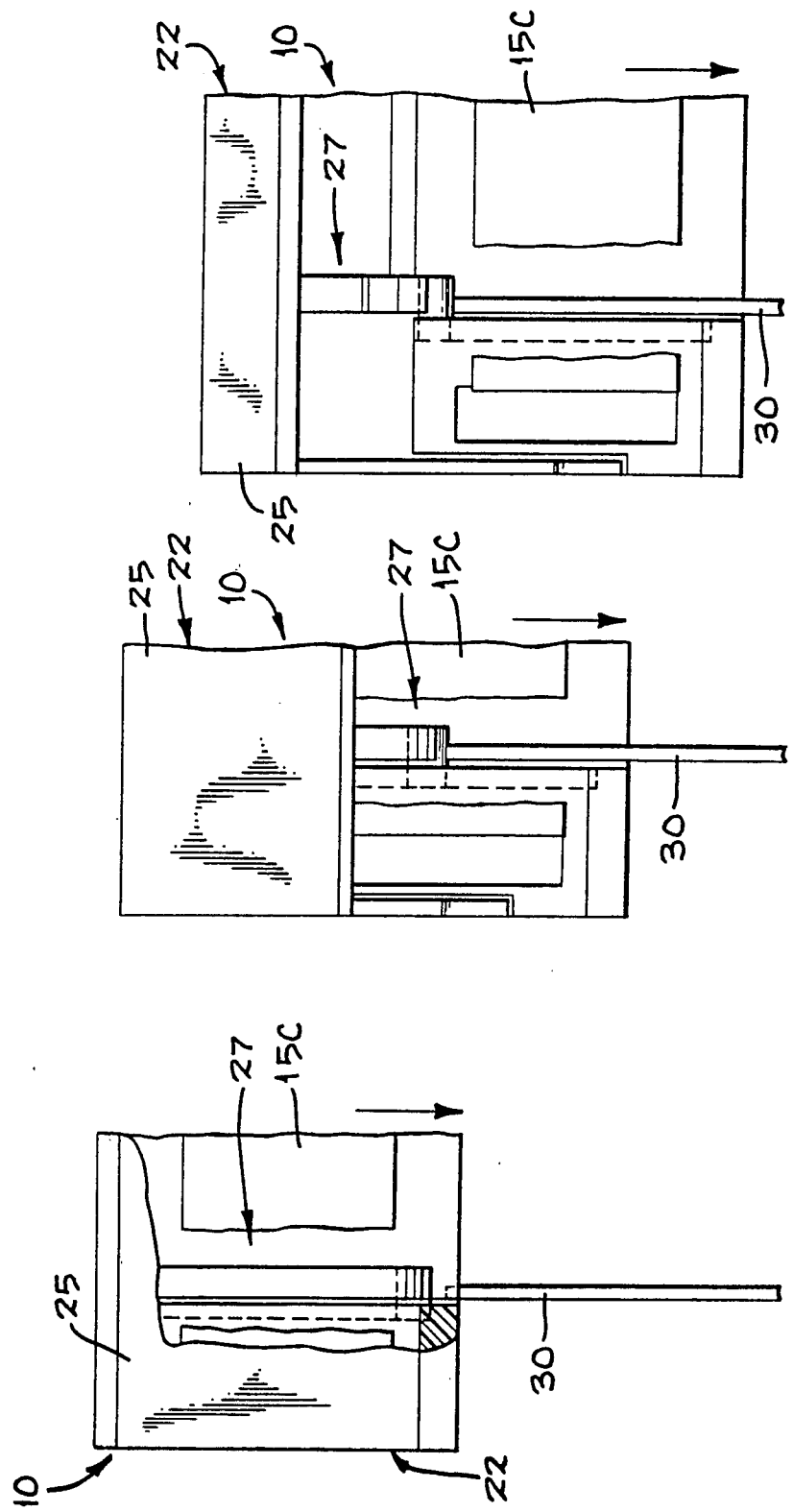

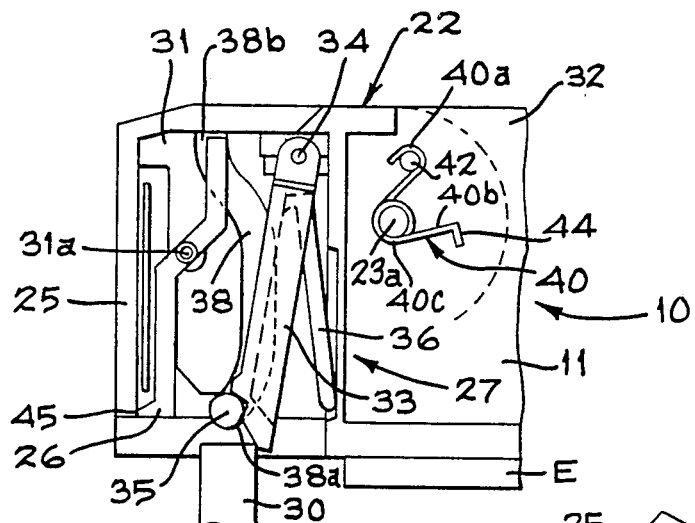
FIG_5A
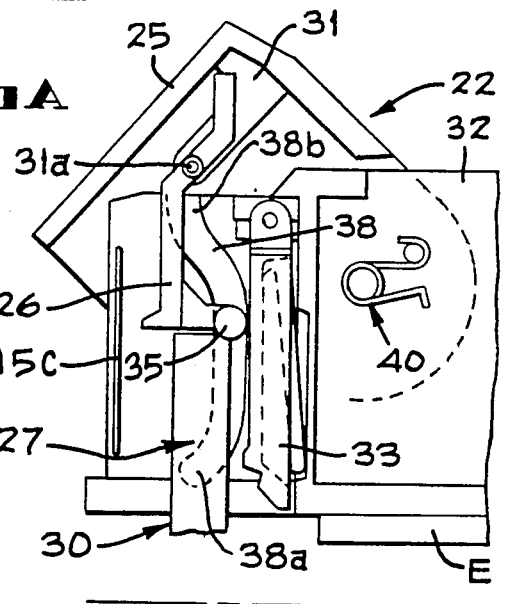
FIG_5B
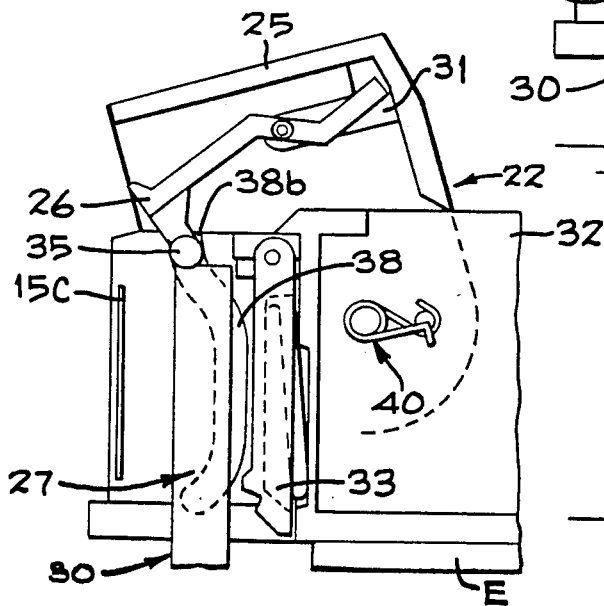
FIG_5C

DOOR OPERATING MECHANISM FOR A CASSETTE USABLE IN A MAGNETIC TAPE RECORDER

This invention relates to a magnetic tape cassette for use in a tape transport such as a magnetic tape recorder, and in particular to a door operating mechanism for the cassette.

A tape cassette for a tape transport such as a magnetic tape recorder generally comprises a plastic body enclosing a pair of tape reels carrying either a prerecorded tape for reproduction or a blank magnetic tape for recording. Such plastic bodies include one or more doors which are closed to protect the tape surface from the environment. In order to record on or reproduce from the tape, a set of record/reproduce heads in the recorder must be placed in contact with the tape. To withdraw the tape from the cassette and to bring it into contact with the heads of the recorder, that door or doors must be opened.

Various mechanisms have been employed in the past to open the door or doors of a magnetic tape cassette. Typically the cassette is loaded into the recorder by a loading mechanism which draws the cassette into the recorder in a horizontal orientation in a first mode of operation and then lowers the cassette vertically in a second mode of operation to a play position by means of an elevator also associated with the loading mechanism of the recorder. The cassette door may be opened as the cassette is loaded into the recorder, or the door may be opened after the cassette has been loaded into the elevator as the elevator descends to place the cassette in the record or play position, or the door may be opened once the cassette is in the play position.

A survey of magnetic tape cassettes finds various door latch mechanisms. Such mechanisms may be located either at the bottom, side or front of the cassette. Typically, the door latch mechanism operates with separate mechanisms provided in the recorder for unlatching the door and for opening the door. For example, with the loading mechanism in a first mode of operation a door latch mechanism associated with the cassette may be opened by a latch engaging mechanism of the recorder to unlatch the door or doors of the cassette. A door holding mechanism of the recorder then engages the door to open it and to retain it in the open position when the loading mechanism has completed the second mode of operation. If the latch engaging mechanism which unlatches the door is designed to incorporate the mechanism which opens the door when the cassette is loaded into the recorder in the play mode, with such new mechanism designed to function during a single mode of operation of the recorder, substantial economies of design and cost are achieved.

Generally, a recorder is designed to use only a single size cassette. Thus, in a scheme devised for using cassettes of different sizes within a single recorder, the usual method for unlatching the door of the cassette is combined with the usual method for opening the door to provide a separate latch engaging mechanism and a separate door opening mechanism for each size of cassette contemplated for use with the recorder. Thus, a known latching scheme for such a series of cassettes includes a separate door latch mechanism, a separate latch engaging mechanism and a separate door opening mechanism for each size cassette of the series. Thus it would be desirable if the single door latch mechanism not only cooperated with the latch engaging mechanism in the recorder but also that such latch engaging mechanism should be so designed to include a door opening mechanism therein. A door operating mechanism comprising the arrangement of such mechanisms should also be designed so that such a door operating mechanism is operative with all of the sizes of cassettes that the recorder is expected to use.

Certain additional features not known in the art make the proposed door operating mechanism particularly desirable for the uses outlined above. For example, the door latch mechanism is mounted in an area common to all of the cassettes in the series, in which the door latch mechanism of the cassette is aligned with the latch engaging mechanism in the recorder, with each size cassette used in the recorder having its respective door latch mechanism located a common distance from a cassette center line and aligned with the latch engaging mechanism provided in the recorder. Another desirable feature is that such door latch mechanism is compatible with a multiple door assembly for the cassette. Advances in cassette design propose to protect the tape run extending across the access opening by protecting it between inner and outer portions of the door assembly. The improved door latch mechanism must be constructed to control the rotation of the door assembly not only to limit the intrusion of the door assembly into the recorder environment but also, and most importantly, to control the movement of the door assembly to prevent the rotation thereof from interfering with the tape run. A door operating mechanism which incorporates the features recited above for use with a cassette in a recorder capable of receiving cassettes of multiple sizes would also obviate the need for multiple door latch, latch engaging and door opening mechanisms for different sizes of cassettes and achieve simplicity of design, simplicity of construction, and be particularly cost effective.

The present invention pertains to a door operating mechanism including a door latch mechanism for a magnetic tape cassette which is particularly useful for a series of cassettes of varying size and play length to be used in a single video tape recorder. The door latch mechanism is mounted on a rotatable door assembly of the cassette. Such mechanism cooperates with a latch engaging mechanism provided in the recorder. When the cassette is loaded into the recorder, the latch engaging mechanism engages the door latch mechanism to rotate the door assembly of the cassette from a fully closed to a fully opened position. The latch engaging mechanism cooperates with the door latch mechanism so as to provide a holding mechanism which retains the cassette door assembly in the fully opened position until the cassette is unloaded from the recorder.

As the cassette is unloaded from the recorder, the cassette door assembly returns to its fully closed position. At the fully closed or initial position the door latch mechanism is biased to retain the cassette door assembly in the closed position.

The door latch mechanism for each size cassette is provided in the threading area of the cassette at the same distance from the mid-line of the cassette to permit cooperation of all cassettes of the series with the single latch engaging mechanism provided in the recorder for rotating the door assembly from a fully closed to a fully opened position to thus provide a uniform door operating mechanism for a series of cassettes of varying sizes to be used in a single recorder.

Further, the latch engaging mechanism of the door operating mechanism has been designed to open the door to eliminate the need for a separate door opening mechanism. A better understanding of the present invention can be obtained by considering the detailed description set forth below.

BRIEF DESCRIPTION OF THE DRAWINGS

The accompanying drawings illustrate an embodiment of the present invention applied to a magnetic tape cassette for a video tape recorder in which:

FIG. 1 is a perspective view of a magnetic tape cassette as it would appear prior to loading in a video tape recorder, with portions thereof removed to show the door latch mechanism of the present invention;

FIG. 2 is a plan view of a family of magnetic tape cassettes of different sizes, including the cassette of FIG. 1, all cassettes having a common threading area;

FIG. 3 is a side elevation of a video tape recorder receiving a magnetic tape cassette having the door latch mechanism of the present invention provided therein;

FIG. 4A is a partial front elevation of the cassette of FIG. 3, taken generally along the line 4—4 with portions thereof broken away to show the door latch mechanism of the present invention and its interaction with a latch engaging mechanism provided in the recorder, the door latch mechanism and the latch engaging mechanism in an initial or fully closed position;

FIG. 4B is a view like FIG. 4A, but with the door latch mechanism and the latch engaging mechanism at a mid-point of their operation;

FIG. 4C is a view like FIG. 4A, but with the door latch mechanism and the latch engaging mechanism in a fully opened position;

FIG. 5A is a detail view of a door assembly similar to the section shown by breaking away the portion of FIG. 1, taken generally along the lines 5—5, and including the door latch mechanism of the present invention, with the door assembly in the fully closed position;

FIG. 5B is a detail view of the door assembly of FIG. 5A at a mid position of its rotation; and FIG. 5C is a detail view of the door assembly of FIG. 5A at the fully opened position.

DESCRIPTION OF THE PREFERRED EMBODIMENT

Referring first to FIGS. 1 and 2, there is shown a video tape cassette 10 which has a flat rectangular parallelepiped shape, and includes a cassette casing 11 which comprises an upper half section 12 and a lower half section 13, both molded from a strong synthetic resin such as Polycarbonate. The upper half section 12 and the lower half section 13 are appropriately joined along a parting line 14 and held together by appropriate joining means, such as an adhesive material applied to sections 12, 13 along the parting line 14. The interior elements of the cassette can take various forms.

For example, in FIG. 2, there is provided in the video cassette 10 (the smallest cassette) appropriate means for rotatably mounting a pair of reels 15a, 15b, for supply and take-up respectively. Separate rotatable spindles (not shown) are provided in the casing 11 for each of the reels 15a, 15b. A spool of tape can then be mounted on the supply reel 15a to provide a tape run 15c to the take-up reel 15b. The supply reel 15a sends out a run of tape that first encounters a tape guide 16, then extends across an access opening 18, around a second tape guide 20 and onto the take-up reel 15b. The access opening 18 is adjacent a cassette door assembly 22.

The cassette door assembly 22 is also molded of synthetic resin and includes a pair of ears 23 and 24 directed rearwardly from a front portion 25 of the door assembly 22. The ears 23 and 24 are rotatably mounted by pins 23a, 24a engaging respective mounting openings 23b, 24b at opposite sides of the casing 11, whereby the door assembly 22 is rotatably supported by the casing 11 to open and close across the tape access opening 18 to selectively provide access to the tape within the cassette 10. The door assembly 22 includes an inner door member 26 which lies generally parallel to the front portion 25 and is rotatably connected thereto. A door latch mechanism 27 is also provided on the cassette 10. In the preferred embodiment two door latch mechanisms 27 are provided in a threading area 28 of the cassette 10 with one mechanism 27 adjacent each tape guide 16, 20.

Referring now to FIG. 3, a latch engaging mechanism 29 provided in a video tape recorder R includes a door lift bar 30 which cooperates with respective door latch mechanisms 27 (FIG. 1) provided inboard of tape guides 16 and 20 on opposite sides of the cassette 10. As shown in FIG. 3, in a first mode of operation, a loading mechanism of the video tape recorder R receives the cassette 10 in a horizontal orientation as it is loaded into the recorder R. In a second mode of operation, an elevator E of the loading mechanism then lowers the cassette vertically to the play position. As the elevator E lowers the cassette 10 to the play position the door lift bar 30 engages the latch mechanism 27 (FIG. 1) provided on the cassette 10 to rotate the door assembly 22 from a fully closed position to a fully rotated, fully opened position as shown in the uppermost figure in dotted lines in FIG. 3.

The interaction of the recorder R and the cassette 10 is better seen in FIGS. 4A-C. In FIG. 4A the door lift bar 30 of the recorder R is about to be engaged by one of the door latch mechanisms 27 of the descending cassette 10. The door assembly 22 is in the fully closed position. In FIG. 4B the cassette 10 has descended to a mid position, with the door assembly 22 partially rotated through the engagement of the door lift bar 30 with the door latch assembly 27. In FIG. 4C the cassette 10 has descended to an operating position within the recorder R. At that point the door lift bar 30 has pushed the door latch mechanism 27 to the fully rotated position to rotate the door assembly 22 to the fully opened position.

A better understanding of the door latch mechanism 27 and its cooperative relationship with the door assembly 22 may be obtained by examining the same sequence shown in FIGS. 4A-C from the slightly different perspective shown in FIGS. 5A-C.

First the door latch mechanism 27 and the operative relation of the elements thereof will be described in detail. However, because each door latch mechanism 27 has the same configuration and parts, only a single mechanism need be described.

The relationship between the cassette 10 and the door latch mechanism 27 can best be seen in FIG. 5A wherein the door assembly 22 is shown in the closed position. The door assembly 22 comprises the front portion 25 and the inner door member 26 pivotable on an inner leg 31 of the door assembly 22 at pivot point 31a. Door assembly 22 pivots about the pivot points 23b, 24b provided on a front portion of a side wall 32 of the cassette 10. Interposed between the pivot points 23b, 24b and the front portion 25 of the door assembly 22 is the door latch mechanism 27.

Such mechanism 27 includes an elongated latch bar 33 having an upper end pivoted about a pivot pin 34 provided adjacent an upper end of the cassette 10 and a lower end biased against a latch pin or cam follower 35 by a flexure member 36. Cam follower 35 is rigidly connected to a lower end of the inner door member 26. Cam follower 35 is also positioned in a curved cam element or path 38 at the fully closed position of the door assembly 22. The cam follower 35 follows the cam path 38 from a fully closed position 38a to a fully opened position 38b.

A torsion spring 40 mounted at the pivot point 23b biases the door assembly 22 to the closed position. The spring 40 has separate ends 40a and 40b which extend from a central spring portion 40c mounted at the pivot point 23b at one end of the door assembly 22. The end 40a is mounted on a member 42 fixed to the door assembly 22 and moveable therewith, and the end 40b engages a fixed member 44 provided on the cassette casing 11.

In the preferred embodiment the inner door member 26 is in generally parallel alignment with the front portion 25 of the door assembly 22. A forward edge 45 of the inner door member 26 extends to the front portion 25 to enclose that portion of the tape run 15c extending across the tape access opening 18 between the front portion 25 and the inner door member 26.

The operation of the door latch mechanism 27 in cooperation with the latch engaging mechanism 29 may now be examined in FIGS. 5A-C.

In FIG. 5A, the cassette 10 is being loaded into the recorder R (FIG. 3) vertically, or in the second mode of operation of the loading mechanism of the recorder R, and the door assembly 22 is in the fully closed position. As the elevator E begins to lower the cassette 10 to an operating position within the recorder R, interaction with the door lift bar 30 moves the lower end of the latch bar 33 out of engagement with the latch pin or cam follower 35 against the bias of the flexure element 36. Once the lower end of the latch bar 33 is disengaged from the latch pin 35, further downward travel of the cassette 10 causes the lift bar 30 to guide the cam follower 35 along the cam path 38. The shape of the cam path 38 permits the door assembly 22 to readily pivot to a fully opened position with a minimal intrusion into the interior space of the recorder R and raises the inner door member 26 vertically until it is clear of the tape run 15c.

As the cam follower 35 travels along the cam path 38, the front portion 25 pivots about the case 10 in a direction opposite to the pivotal movement of the inner door member 26, both elements 25, 26 moving away from the tape run 15c extending across access opening 18, the cam path generally preventing the rotation of the inner door member 26 from interfering with the tape run 15c (FIG. 5B). When the cam follower 35 reaches the fully opened position 38b of the cam path 38, the door assembly 22 is in the fully opened position (FIG. 5C). The door lift bar 30 and the latch mechanism 27 cooperate to retain the door assembly 22 in the fully opened position until the cassette 10 is removed from the recorder R.

When the cassette 10 is removed from the recorder R, the bias of the spring 40 returns the door assembly 22 to the fully closed position, causing the cam follower 35 to reverse its travel along the cam path 38 to the fully closed position 38a. At the fully closed initial position 38a, the latch bar 33 is biased by flexure means 36 into engagement with the cam follower 35 to hold the door assembly 22 in the fully closed position.

The door operating mechanism used for providing the door latch mechanisms 27 on the cassette 10 can be readily adaptable for cassettes of different sizes as shown in FIG. 2. For example, a medium size cassette M having supply reel 46a and take-up reel 46b as well as a large cassette L having supply reel 48a and take-up reel 48b could all utilize the common threading area 28 to provide latch mechanism 27 in the area 28 aligned with door lift bar 30 provided in the recorder R and mounted adjacent the tape guides 16 and 20 to utilize a single configuration for the door latch mechanism 27 with each of the cassettes 10, M, L of different sizes wherein all sizes of cassettes utilize the common threading area 28 and common locations for each door latch mechanism 27 of each cassette 10, M, L and each mechanism 27 is located a common distance X from a midline 50 of each cassette 10, M and L.

Although the preferred door operating mechanism employs two door latch mechanisms on opposite sides of the mid-line 50 of the cassette 10, it would be recognized that an alternative construction requiring only a single mechanism per cassette is an operative variation.

Having described the preferred embodiment of the present invention, it is understood that such invention is not limited to the above description and that various changes and modifications may be made therein without effecting the scope and contents thereof. Such scope is to be defined by the appended claims.

What is claimed is:

1. A tape cassette for holding a supply of tape at a supply position for transport across an access opening to a take-up position, the cassette insertable into a tape transport means, said cassette comprising:
    a door assembly positioned at said access opening and having a closed-position for protecting said tape, and being pivotable to an opened position to provided access to said tape;
    biasing means for biasing said door assembly to said closed position;
    a cam path provided in said cassette having a closed position and an opened position;
    a cam follower provided on said door assembly for engaging said cam path for guiding said door assembly between said closed and opened positions and positioned for engagement by external opening means provided on the tape transport means; and
    a cam follower latch for maintaining said cam follower in said closed position, the cam path, the cam follower and the cam follower latch positioned to cooperate with the external opening means, which first releases said cam follower latch, then engages said cam follower to pivot the associated door assembly from the closed position to the opened position, and thereafter retains said door assembly in the opened position.

2. A tape cassette as claimed in claim 1 wherein the cam path from the closed position to the opened position is arcuate to define the pivotable movement of the door assembly in a manner to minimize the projection of the door assembly into the environment of the tape transport means and to prevent interference of portions of the door assembly with the tape run extending across the access opening during travel from the closed position to the opened position.

3. A tape cassette as claimed in claim 1 wherein an inner door member is aligned in parallel relationship with a front portion of the door assembly when the door assembly is in the closed position, the inner door member including a projection provided at a lower end thereof to engage a lower end of the front portion of the door assembly to substantially enclose the tape extending across the access opening of the cassette when the door assembly in the closed position.

4. A tape cassette as claimed in claim 3 wherein the cam follower is mounted on the inner door member of the door assembly, the inner door mounted for rotation with respect to the front portion of the door assembly in the rotation of the door assembly from the closed to the opened position to prevent interference of the inner door member with the tape run during said rotation.

5. A tape cassette as claimed in claim 1 wherein the latch includes a latch bar pivotably mounted in the cassette to engage the cam follower in the locking position; and flexure means associated with the latch bar for biasing the latch bar to the locking position.

6. A tape cassette as claimed in claim 1 comprising a pair of latches symmetrically disposed on the cassette and aligned with a pair of opening means symmetrically mounted in the tape transport means.

7. A tape cassette as claimed in claim 6 which includes a pair of tape guides disposed at opposite ends of the cassette adjacent the door assembly and respective latches are provided inboard of the tape guides and symmetrically disposed on the cassette.

8. For a pivotable door assembly of a magnetic tape cassette having a cam path, the cam path having a closed position and an opened position for the door assembly, a cam follower engaging the cam path, and a latch engaging the cam follower to retain the door assembly in the closed position, a method of operating said door assembly comprising:

using an opening means provided externally of the cassette, on a tape transport means receiving the cassette, initially to engage the latch to release said cam follower at the closed position of the door assembly, then to engage the cam follower and move it along the cam path to rotate the door assembly to the opened position, and thereafter to retain the door assembly in the opened position.

9. A tape cassette for holding a supply of tape at a supply position for transport across an access opening to a take-up position, the cassette insertable into a tape transport means, said cassette comprising:

a door assembly positioned at said access opening and having a closed position for protecting said tape, and being pivotable to an opened position to provide access to said tape;

said door assembly comprising an outer door and an inner door in pivotable engagement;

biasing means for biasing said door assembly to said closed position;

a cam path provided in said cassette, and having a closed position and an opened position;

a cam follower provided on said door assembly for engaging said cam path for guiding said door assembly between said closed and opened positions, and positioned for engagement by external engaging means provided on the tape transport means, said cam follower mounted on the inner door for cooperative pivotable movement with the outer door; and a cam follower latch for maintaining said cam follower in said closed position, the cam path, the cam follower and the cam follower latch positioned to cooperate with the external engaging means, which first releases said cam follower latch, then engages said cam follower to pivot the associated door assembly from the closed position to the opened position, and thereafter retains said door assembly in the opened position.

10. A door operating mechanism for a tape cassette insertable into a tape transport means, said tape cassette holding a supply of tape at a supply position for transport across an access opening to a take-up position, and having a door assembly positioned at said access opening, said door assembly pivotable between a closed position for protecting the tape and an opened position to provide access to said tape, said door operating mechanism comprising;

a door latch mechanism including a cam path provided in the cassette and extending from the closed position to the opened position of the door assembly; a cam follower provided on said door assembly for engaging the cam path for guiding the door assembly between said the closed and the opened positions;

a latch bar for maintaining said cam follower in the closed position; and means for biasing the latch bar to retain the cam follower in the closed position of the door assembly;

a latch engaging means provided on the tape transport means and externally of the cassette for driving the cam follower along the cam path, the cam path, the cam follower and the latch bar positioned to cooperate with said external latch engaging means, which first disengages the latch bar to release the cam follower, then engages said cam follower to pivot the door assembly from the closed to the opened position, and thereafter retains the door assembly in the opened position.

11. A door operating mechanism as claimed in claim 10, wherein the door assembly comprises an outer door member and an inner door member, the inner door member rotating with respect to the outer door member as the door assembly moves from the closed to the opened position, the inner door member fixedly secured to the cam follower to move along the cam path during such movement to prevent engagement of said member with the tape run of the cassette.

* * * * *